April 28, 1936. S. J. RAND 2,038,904
DEHYDRATING MACHINE
Filed Oct. 24, 1934
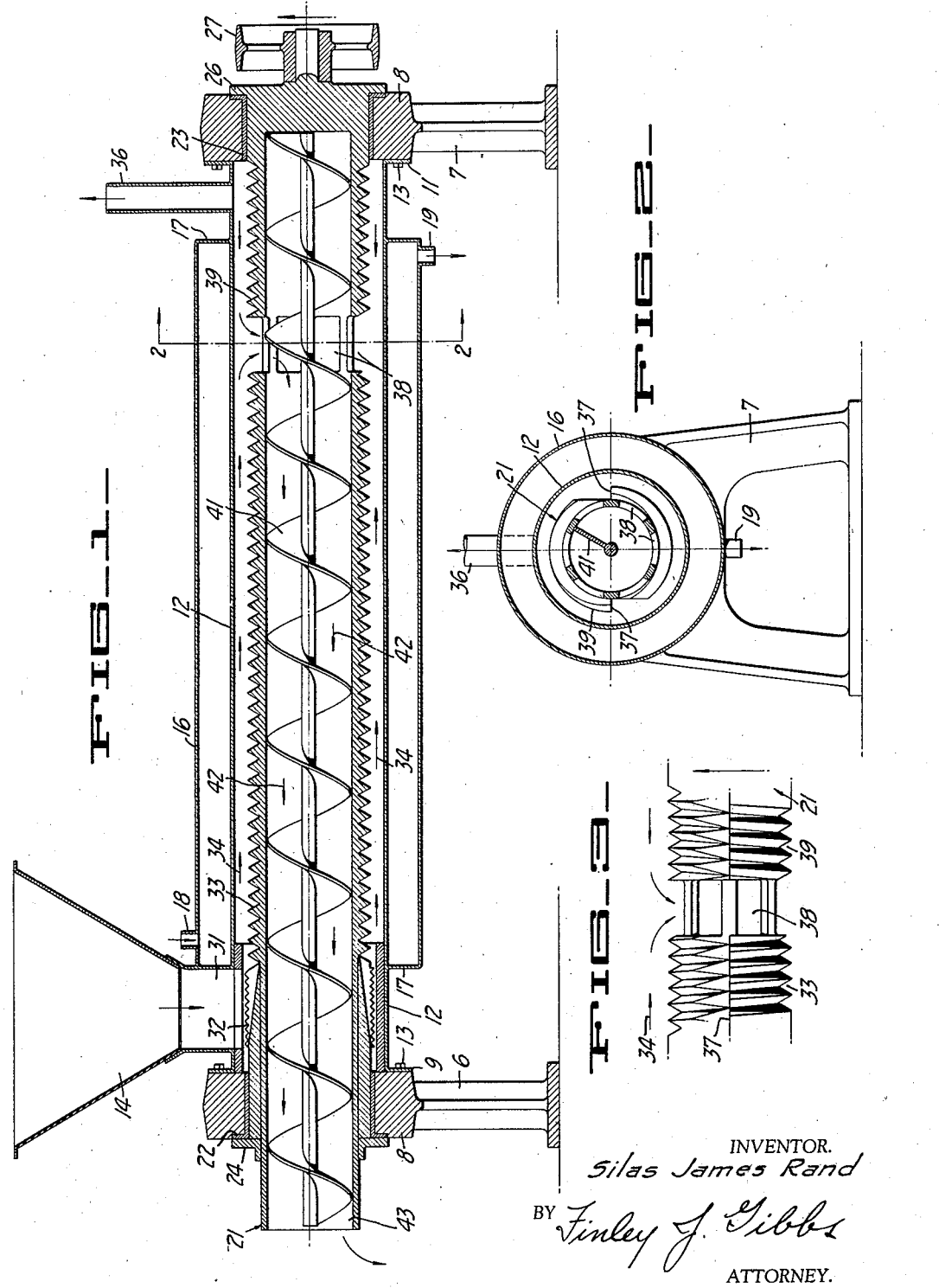
INVENTOR.
Silas James Rand
BY Finley J. Gibbs
ATTORNEY.

Patented Apr. 28, 1936

2,038,904

UNITED STATES PATENT OFFICE 2,038,904

DEHYDRATING MACHINE

Silas James Rand, San Juan del Monte, P. I., assignor of one-half to Allison J. Gibbs, alias Allison Gibbs, Jr., Manila, P. I.

Application October 24, 1934, Serial No. 749,735

5 Claims. (Cl. 34—7)

The invention relates to dehydrating, desiccating or drying machines, and is especially concerned with machines for facilitating the removal of moisture from vegetable matter such as raw coconut meat. It is especially desirable to extract water from raw coconut meat, in order that subsequent extraction of oil will be more readily effected.

An object of my invention is to provide means for extracting water from vegetable material, such as raw coconut meat.

Another object of my invention is to provide a substantially continuous water extraction process.

A further object of my invention is to disrupt the cells of the material in order to extract the water therefrom and to facilitate subsequent oil extraction.

A further object of my invention is in general to reduce the time and increase the efficiency of water-removing processes of the type specified, by utilizing the machine of my invention.

An additional object of my invention is to minimize any adverse effects which might arise because of contact of a large amount of atmospheric air with the material being dried.

The foregoing and other objects are attained in the embodiment of the invention illustrated in the drawing, in which—

Fig. 1 is a cross-section on a longitudinal, diametral plane of a dehydrating machine constructed in accordance with my invention.

Fig. 2 is a cross-section the plane of which is indicated by the lines 2—2 of Fig. 1.

Fig. 3 is a detail showing in side elevation a part of the main feed screw of my dehydrating machine.

While the machine of my invention is useful with any suitable sort of vegetable matter, such as bananas, potatoes and the like, I find it especially useful in connection with raw coconut meat which is to be treated for the extraction of the oil therefrom, and for that reason I have described my invention herein in that especial connection. In accordance with my invention, therefore, I provide a framework including uprights 6 and 7, each of which is provided with a face 8 against which are abutted end flanges 9 and 11 of a cylindrical casing 12. The flanges and the casing are held in place by suitable fastenings 13. Adapted to communicate with the interior of the casing 12 is a feed hopper 14 which is designed to receive, in relatively large pieces or portions, the raw coconut meat to be desiccated. Since, in accordance with my invention, I provide means for heating the coconut meat as it is traversing the machine, I preferably encompass the member 12 with an outer jacket 16 closed by end plates 17 and having an inlet 18 for a heating fluid such as steam, and an outlet 19 for the discharge of such heating fluid. In accordance with the arrangement as so far described, the shell 12 is subjected to an elevated temperature exteriorly, and is supplied on its exterior with raw coconut meat to be dried.

In order that the coconut meat may be finely divided and then propelled through the shell 12, I dispose a feed member 21 to revolve in suitable bearings 22 and 23 in the standards 6 and 7. The feed member is a cylindrical body which is held against axial movement by flanges 24 and 26 and is rotated by means of a pulley 27 suitably secured at one end thereof and connected to a propulsive machine (not shown). Carried on the member 21 in the vicinity of the throat 31 of the hopper 14 is a grinding unit 32 which has for its purpose the breaking up or comminuting of the raw coconut meat into small pieces. The degree of fineness of grinding can, of course, be regulated in individual circumstances by providing suitable grinding units 32 which are interchangeably mounted on the cylinder 21.

From the grinding unit 32 the finely separated coconut meat is fed into the interior of the shell 12 into contact with a thread or worm 33 which is preferably formed integrally with the cylinder 21 and is of such a pitch and direction that it impels the coconut meat to flow in the direction of the arrows 34 in contact with the shell 12 and in thermal relationship to the heating medium inside the jacket 16. As a consequence of such heating, not only is surface liquid driven off from the raw coconut meat, forming a vapor which escapes through an outlet duct 36, but also water which is within the cells of the coconut meat suddenly expands into steam and disrupts such cells, thereby making the subsequent extraction of oil much simpler and easier.

As the coconut meat travels along in the direction of the arrows 34, it is increasingly dried, and, in order to accelerate and facilitate such action, the coconut meat is agitated as well as propelled, by certain ledges 37 formed by axial interruptions extending along the member 21 and interrupting the threads 33, so as to omit the supporting effect of the thread walls periodically and likewise so that the flat ledges or faces 37 will tend to throw the coconut meat tangentially outward against the shell 12. In this fashion the coconut meat is considerably agitated as it advances, and finally arrives at a series of circumferential apertures 38 piercing the member 21 and permitting the coconut meat access to the interior thereof. Threads 39 are cut in the opposite direction between the apertures 38 and the bearing 23, in order that coconut meat will not attempt to continue toward the bearing or toward the vapor outlet 36.

In order to discharge the suitably dried coconut meat from the machine, but in order not to lose a large amount of the heat therefrom quickly, and furthermore in order that even further drying-out of moisture may continue, I provide means for returning the dried coconut meat through the interior of the member 21. Such return flow is effected by means of a screw conveyor 41 which is fixed within the cylindrical member 21 and revolves therewith, but which is so pitched that the coconut meat is impelled in the direction of the arrows 42 and finally flows from the outlet 43. Ordinarily, the outlet 43 is directly connected to a machine for expressing the oil from the dried coconut meat.

In accordance with my invention there is provided a way of tumbling and agitating the coconut meat, after it has been finely divided, in contact with a suitable heating medium, so that the water naturally contained therein is driven off and so that some of such water, in bursting into steam, disrupts the cellular structure of the raw coconut meat in order to render subsequent oil expression more efficient. Furthermore, the amount of heat required is relatively small, since the coconut meat is not discharged from the machine until such time as it has had a chance to give up a good deal of its heat. In addition, except for small leakages, there is no current of atmospheric air flowing along with the coconut meat, so that it is not necessary to heat a large body or volume of air in the machine.

I claim:

1. A dehydrating machine comprising a framework, an externally threaded hollow feed screw rotatably mounted on said framework, a stationary heated jacket surrounding said feed screw, means for supplying material to be dried to said feed screw, a discharge conveyor within said feed screw, and means establishing communication between the exterior of said feed screw and said conveyor.

2. A dehydrating machine comprising a framework, a hollow feed screw rotatably mounted on said framework and having an outlet at one end, a stationary heated jacket surrounding said feed screw, the wall of said jacket and the surface of said feed screw together defining a cylindrical drying chamber, means for supplying material to be dried to one end of said chamber, and means for establishing communication between the other end of said chamber and through the interior of said hollow feed screw to said outlet.

3. A dehydrating machine comprising a cylindrical heated jacket, a feed hopper adjacent one end of said jacket, a hollow feed screw journaled to revolve within said jacket, means on said feed screw adjacent said hopper for dividing material to be dried, means establishing communication between the exterior of said feed screw and the interior thereof, and means within said feed screw for discharging dried material therefrom.

4. A dehydrating machine comprising a framework, a feed screw mounted for rotation on said framework, said feed screw having a hollow interior, a stationary heated jacket on said framework having an imperforate wall spaced from and surrounding said feed screw to provide a cylindrical drying chamber between said wall and the surface of said screw, a feed hopper adjacent one end of said feed screw and communicating with said chamber, means for establishing communication between said chamber and the interior of said feed screw, and a discharge conveyor within the interior of said feed screw.

5. A dehydrating machine comprising a framework, a hollow feed screw mounted for rotation on said framework, a right-hand thread on one portion of the exterior of said screw, a left-hand thread on another portion of the exterior of said screw, means located between said portions for establishing communication between the exterior and the interior of said screw, a discharge conveyor within the interior of said feed screw, and a stationary jacket on said framework surrounding said screw.

SILAS JAMES RAND.